(12) United States Patent
Terry et al.

(10) Patent No.: US 11,873,999 B2
(45) Date of Patent: Jan. 16, 2024

(54) EXPANSION TANK SERVICE VALVE ASSEMBLY

(71) Applicant: NIBCO Inc., Elkhart, IN (US)

(72) Inventors: Andrew J. Terry, Sturbridge, MA (US); Andrew J. Coates, Westminster, MA (US); Christopher W. Mason, Granger, IN (US)

(73) Assignee: NIBCO Inc., Elkhart, IN (US)

( * ) Notice: Subject to any disclaimer, the term of this patent is extended or adjusted under 35 U.S.C. 154(b) by 829 days.

(21) Appl. No.: 16/988,989

(22) Filed: Aug. 10, 2020

(65) Prior Publication Data

US 2022/0042688 A1 Feb. 10, 2022

(51) Int. Cl.
| | |
|---|---|
| *F24D 19/10* | (2006.01) |
| *F16L 43/00* | (2006.01) |
| *F24H 9/20* | (2022.01) |
| *F24H 1/18* | (2022.01) |
| *F16L 41/02* | (2006.01) |

(52) U.S. Cl.
CPC ........ *F24D 19/1066* (2013.01); *F16L 41/021* (2013.01); *F16L 43/001* (2013.01); *F24H 1/188* (2013.01); *F24H 9/2007* (2013.01); *F24D 2220/0242* (2013.01); *F24D 2220/0278* (2013.01)

(58) Field of Classification Search
CPC ............. F24D 19/1066; F24D 19/1015; F24D 2220/0242; F24D 2220/0278; F24D 2220/0271; F16L 43/001; F16L 41/021; Y10T 137/87877; F24H 1/88; F24H 9/2007

See application file for complete search history.

(56) References Cited

U.S. PATENT DOCUMENTS

| | | | | |
|---|---|---|---|---|
| 5,044,338 | A | * | 9/1991 | Shelton ................ F02M 69/465 |
| | | | | 123/456 |
| 6,058,975 | A | * | 5/2000 | Hui-Chen ............. F16K 27/003 |
| | | | | 285/133.4 |
| 6,089,263 | A | * | 7/2000 | Dumser .................... G01F 1/28 |
| | | | | 137/563 |
| 8,375,991 | B2 | | 2/2013 | Erhardt |
| 9,546,475 | B2 | | 1/2017 | Lu |
| 10,208,875 | B1 | | 2/2019 | Zitting |
| 10,247,327 | B2 | | 4/2019 | Doughty et al. |

(Continued)

FOREIGN PATENT DOCUMENTS

| | | |
|---|---|---|
| DE | 202014000877 | 2/2014 |
| RU | 2531717 | 10/2014 |

OTHER PUBLICATIONS

Watts, Thermal Expansion Products, http://media.wattswater.com/PG-ThermExpansion.pdf (2013).

*Primary Examiner* — Kelsey E Cary
(74) *Attorney, Agent, or Firm* — PRICE HENEVELD LLP

(57) ABSTRACT

A plumbing system pressure protection valve assembly that utilizes a unitary body to connect a hot water tank to a cold water supply, a vacuum breaker, and an expansion tank. The assembly includes two ball valves coupled to the unitary body to isolate the hot water tank from the cold water feed and to isolate and permit draining of the expansion tank. The assembly also includes a rod and foot coupled to a tab on the unitary body to provide support for the expansion tank service valve assembly.

20 Claims, 13 Drawing Sheets

(56) References Cited

U.S. PATENT DOCUMENTS

| | | | |
|---|---|---|---|
| 2010/0193043 A1* | 8/2010 | Erhardt | F24H 9/13 |
| | | | 137/215 |
| 2016/0061350 A1* | 3/2016 | Pettinaroli | F16K 31/60 |
| | | | 137/887 |
| 2020/0240650 A1* | 7/2020 | Morita | F24D 3/1091 |
| 2020/0278066 A1* | 9/2020 | Andersson | F16L 55/07 |

* cited by examiner

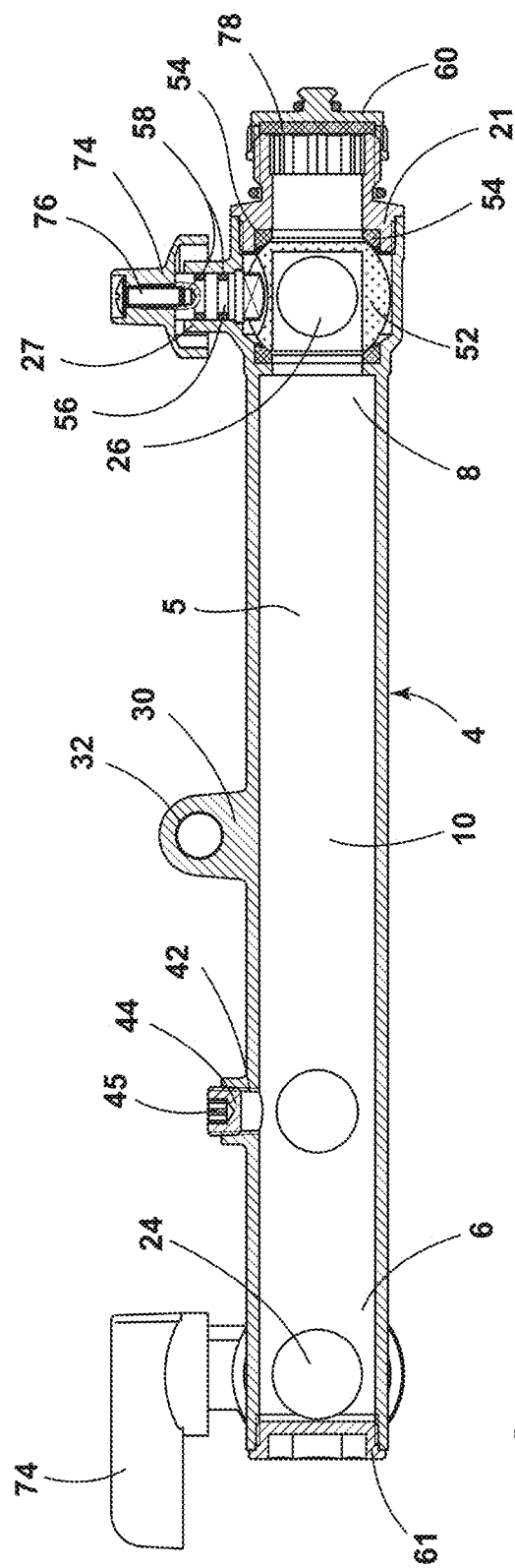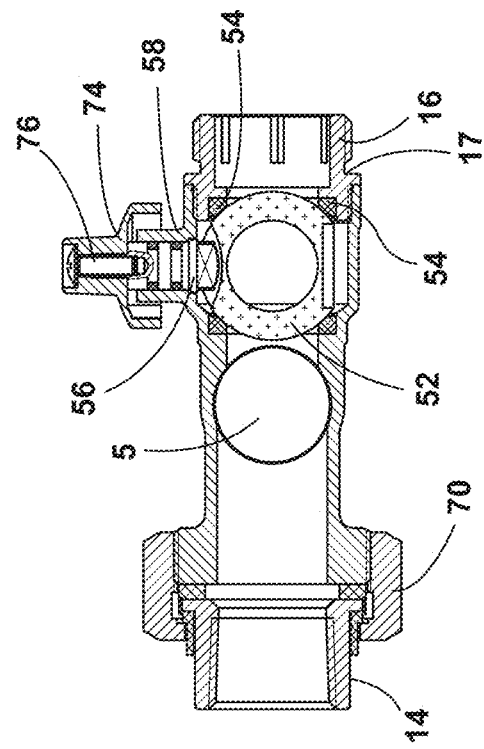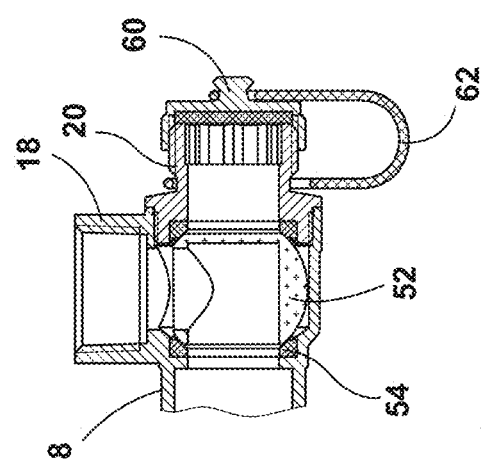
FIG. 3
FIG. 5
FIG. 4

US 11,873,999 B2

EXPANSION TANK SERVICE VALVE ASSEMBLY

BACKGROUND OF THE INVENTION

The present invention relates to a plumbing system pressure protection valve assembly. The pressure protection includes high pressure protection from an expansion tank and low pressure protection from a vacuum breaker. Expansion tanks are designed to handle the thermal expansion of water as it heats up in a water heater, preventing excessive water pressure. If the water pressure gets too high, it can damage valves and plumbing fixtures, joints in the supply pipes, and even the water heater itself. If a building has a check valve or pressure regulating valve on the system supply line, expansion tanks are typically needed and/or required by code. Even if not required by code, an expansion tank can still be used in a plumbing system. Typically, an expansion tank is installed anywhere along the cold inlet line. The weight of expansion tanks can cause stress and/or damage to surrounding plumbing fittings if the weight of the tank is not properly supported. This is especially true if the bladder in the expansion tank fails and the expansion tank fills up. In addition, many building codes require the presence of a vacuum breaker near the tank, requiring additional fittings in the cold water supply. Thus, installing an expansion tank typically requires multiple components, including multiple valves and fittings, and potentially independent support means, including positioning the expansion tank against a wall, floor, or other structure in order to support the tank.

An improved valve assembly that eliminates a number of potential leak paths due to multiple components, as well as providing adequate support and positioning of the assembly and tank, is described herein.

SUMMARY OF THE INVENTION

One aspect of the present invention is an expansion tank service valve assembly. The expansion tank service valve assembly includes a unitary body having a passageway with a first end portion, a second end portion, and a medial portion located between the first end portion and the second end portion. A tee is located within the first end portion. The tee includes a generally vertical section with a first port and a second port and a generally horizontal section extending into the medial portion of the unitary body. A generally vertical third port and a generally horizontal fourth port are located within the second end portion. A fifth port is located within the medial portion. A tab extends from the exterior surface of the medial portion. A first valve member is received in the passageway in the first end portion. The valve member opens the passageway to the second port when the valve member is in the first position and closes the passageway to the second port when the valve member is in the second position. A second valve member is received in the passageway in the second end portion. The second valve member connects the fluid passageway to the third port while blocking the fourth port when the second valve member is in the first position and connects the third port and fourth port while blocking the fluid passageway when the second valve member is in a second position.

Another aspect of the present invention is an expansion tank service assembly. The expansion tank service assembly includes a unitary body having a passageway with a first end portion, a second end portion, and a medial portion located between the first end portion and the second end portion. A generally vertical portion with a first port is located at the first end portion. A generally vertical third port is located at the second end portion. A fifth port is located within a medial portion. The medial portion also includes a tab with a threaded opening extending from an exterior surface of the medial portion. A second valve member is positioned in the passageway in the second end portion, opening the passageway between the medial portion and the third port when the second valve member is in the first position, and closing the passageway between the medial portion and the third port when the second valve member is in the second position. A vacuum breaker is coupled to the fifth port and a tank is coupled to the third port. A threaded stand is coupled to the tab that extends from the medial portion of the body.

Yet another aspect of the present invention is an expansion tank service assembly. The expansion tank service assembly includes a unitary body having a passageway with a first end portion, a second end portion, and a medial portion located between the first end portion and the second end portion. A generally vertical first port is located in the first end portion. A generally vertical third port is located in the second end portion, and a generally vertical fifth port is located in the medial portion. A tab with an opening extends from the exterior surface of the medial portion. A second valve member is positioned in the passageway in the second end portion, opening the passageway between the medial portion and the third port when the second valve member is in the first position and closing the passageway between the medial portion and the third port when the second valve member is in the second position. A vacuum breaker is coupled to the fifth port. A vertical member is coupled to the tab and a horizontal member is coupled to the bottom of the vertical member. A tank is coupled to the third port.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is a cross-sectional view taken along line III-III shown in FIG. 2;

FIG. 4 is a partial cross-sectional view of the second end portion of the assembly shown in FIG. 2;

FIG. 5 is a cross-sectional view taken along line V-V shown in FIG. 2;

DETAILED DESCRIPTION

For purposes of description herein, the terms "upper," "lower," "right," "left," "rear," "front," "vertical," "horizontal," and derivatives thereof shall relate to the invention as oriented in Figures. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
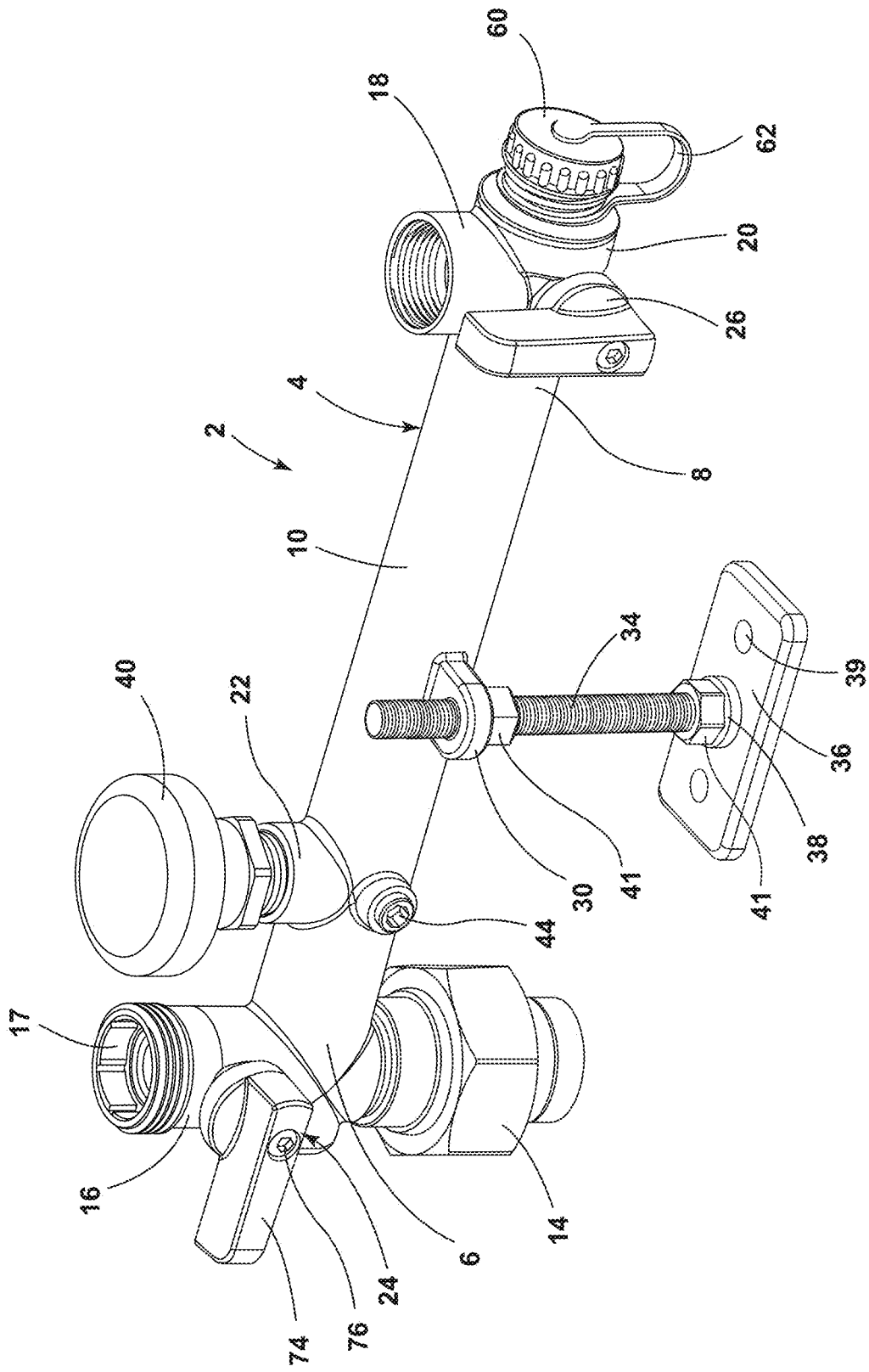
FIG. 1 is a front perspective view of an expansion tank valve assembly.
Figure 2:
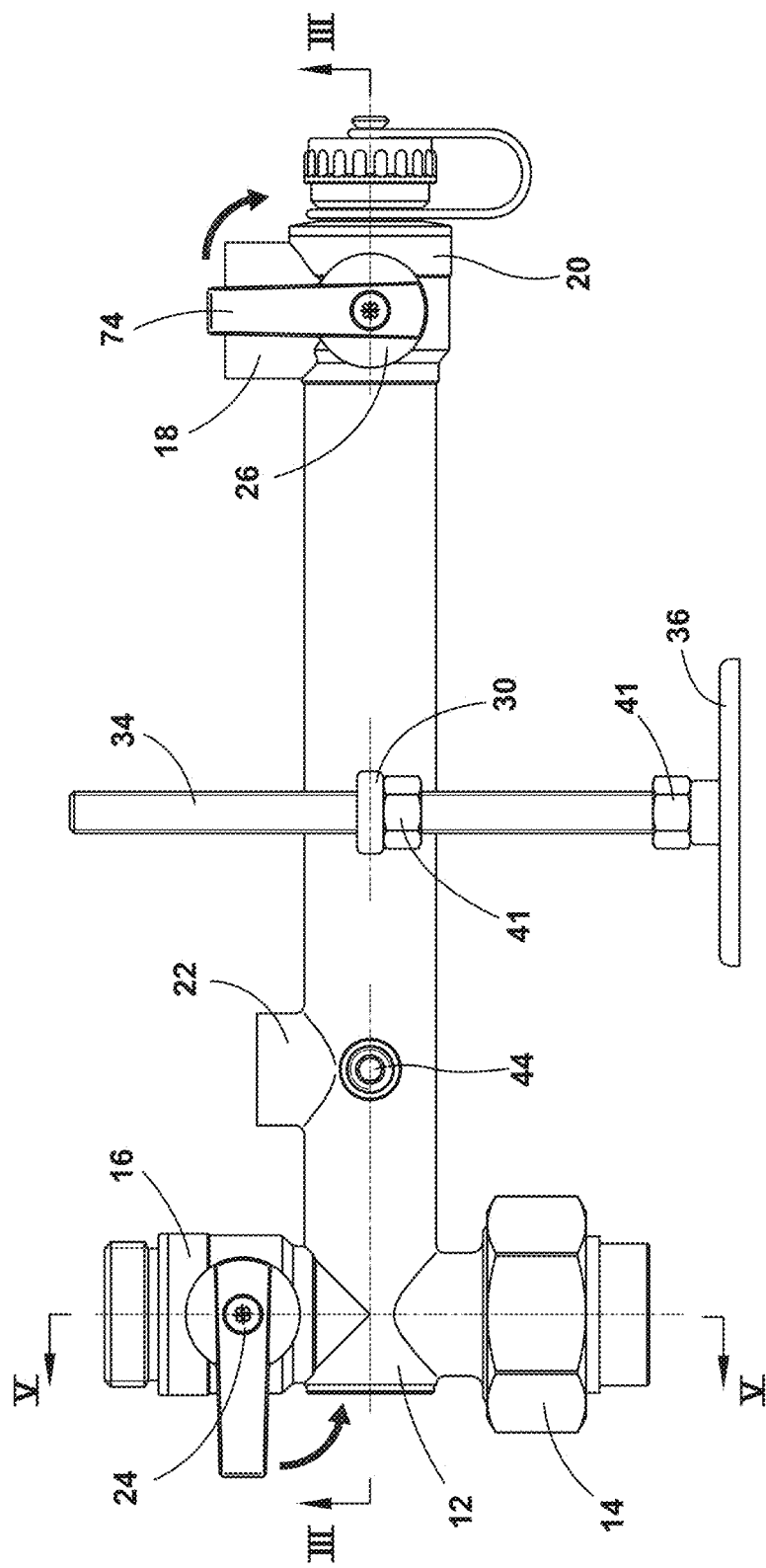
FIG. 2 is a front view of the expansion tank valve assembly shown in FIG. 1 without the vacuum breaker.
Figure 6:
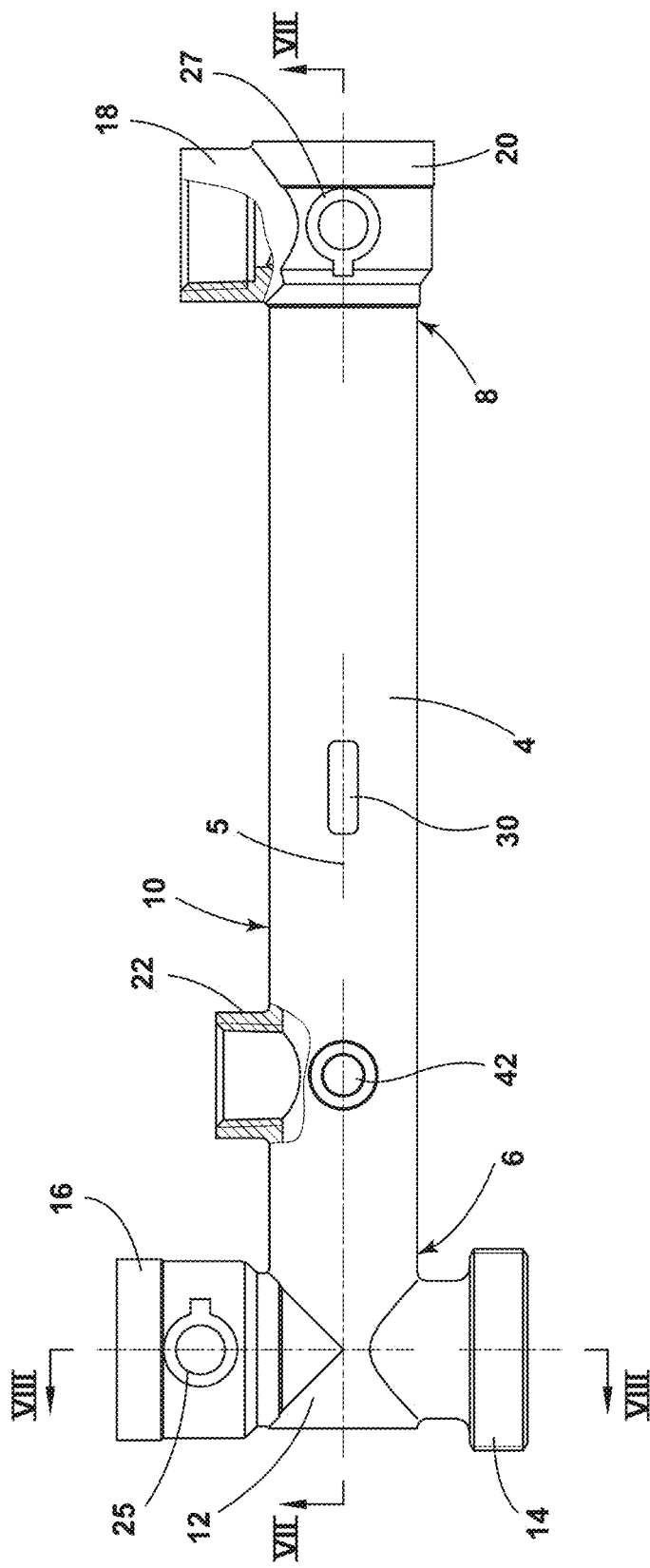
FIG. 6 is a side view of the body of the expansion tank valve assembly.
Figure 21:
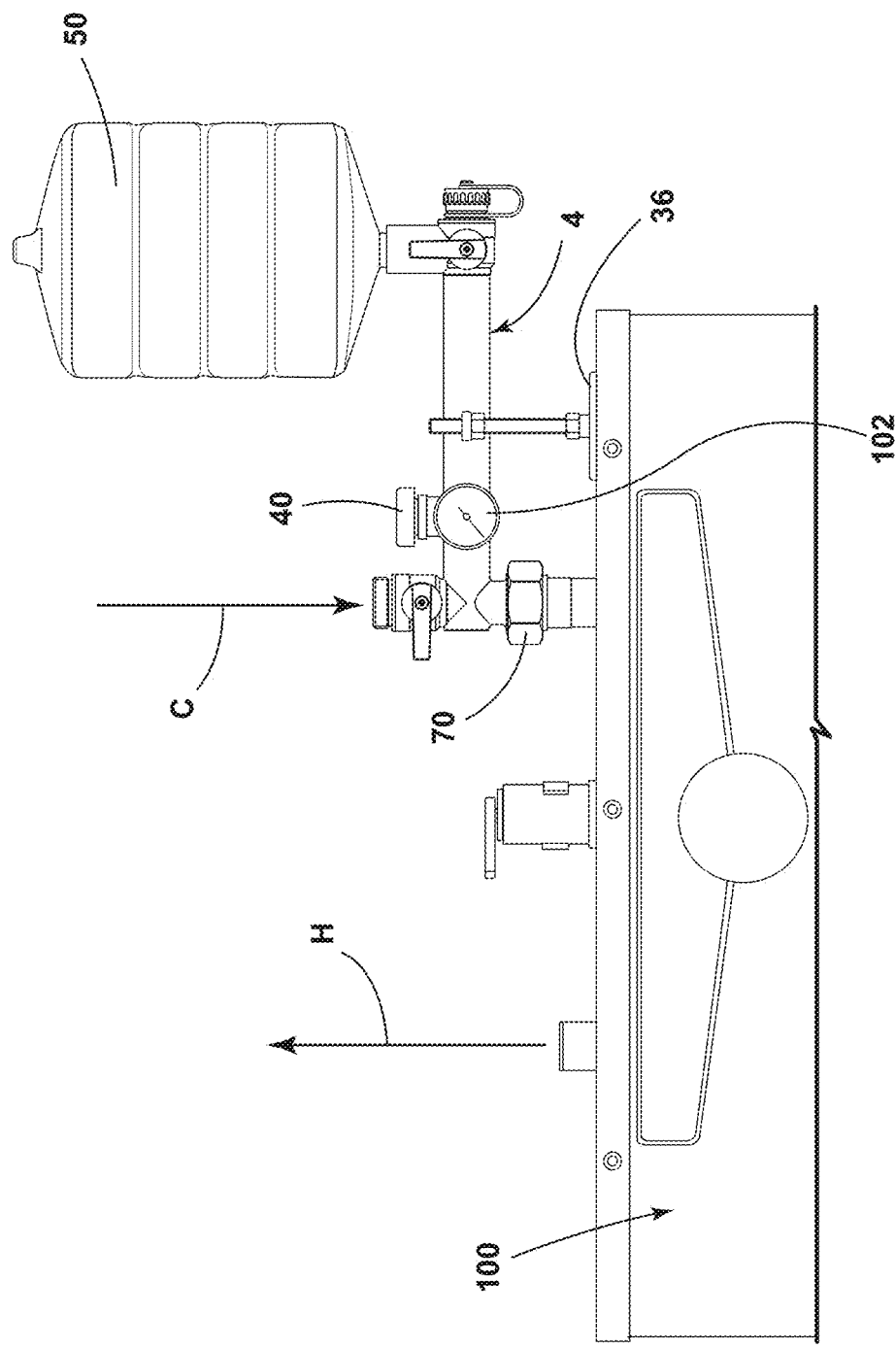
FIG. 21 is a front perspective view of the expansion tank valve assembly installed on the top of a water heater.

An expansion tank valve assembly 2 is illustrated in FIGS. 1-3 and 21. The expansion tank valve assembly 2 can be installed to add an expansion tank 50 off of a hot water tank 100, as illustrated in FIG. 21. The expansion tank valve assembly 2 includes a body 4 with a first end portion 6, a second end portion 8, and a medial portion 10 located therebetween. The body 4 includes a fluid passageway 5 that extends from the first end portion 6 through the medial portion 10 to the second end portion 8, as shown in FIG. 3. The body 4 includes a tee 12 at the first end portion 6, having a vertical portion with a first port 14 and a second port 16, and a horizontal portion that leads to the medial portion 10 of the body 4, as shown in FIG. 6. The tee 12 can also include a cap 61, as shown in FIG. 3, in the generally horizontal orientation opposite of the horizontal portion leading to the medial portion 10. The body 4 has a third port 18 and a fourth port 20 located at the second end portion 8. The body 4 also has a fifth port 22 located in the medial portion 10.

The expansion tank valve assembly 2 includes a first valve member 24 located at the first end portion 6. The first valve member 24 can be used to isolate the hot water tank 100 from the cold water feed C, as illustrated in FIG. 21. The cold water feed C is coupled to the second port 16. The second valve member 26 is located at the second end portion 8. This second valve member 26 can be used to isolate and drain the expansion tank 50.

Figure 7:
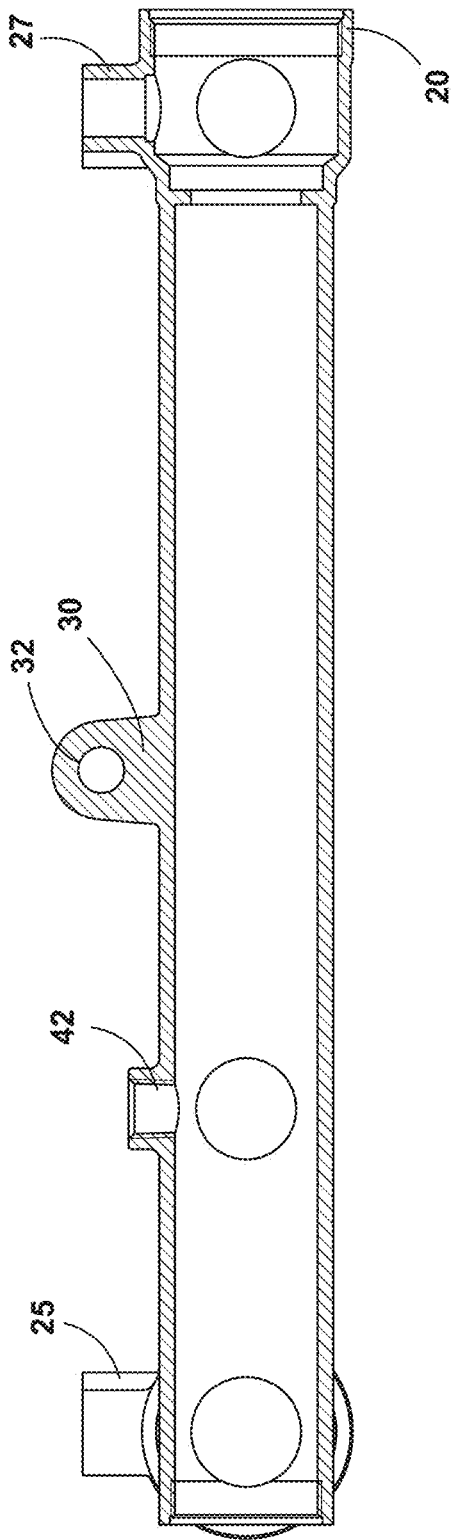
FIG. 7 is a cross-sectional view taken along line VII-VII shown in FIG. 6.
Figure 8:
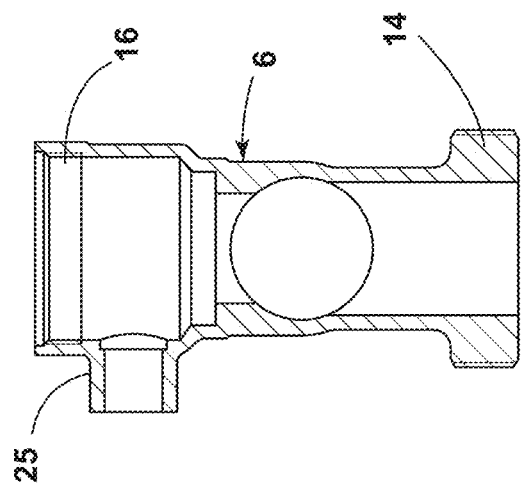
FIG. 8 is a cross-sectional view taken along line VIII-VIII shown in FIG. 6.
Figure 10:
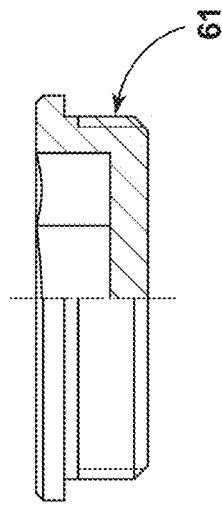
FIG. 10 is a front cross-sectional view of a cap, as shown in FIG. 3.
Figure 9:
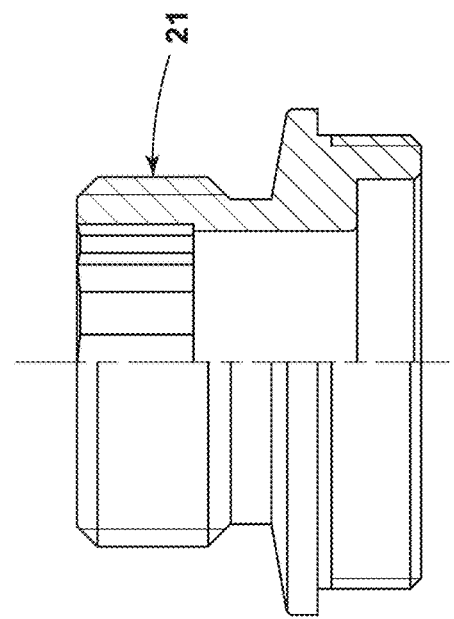
FIG. 9 is a front partial cross-sectional view of the bonnet attached to the fourth port of the assembly shown in FIG. 2.
Figure 11:
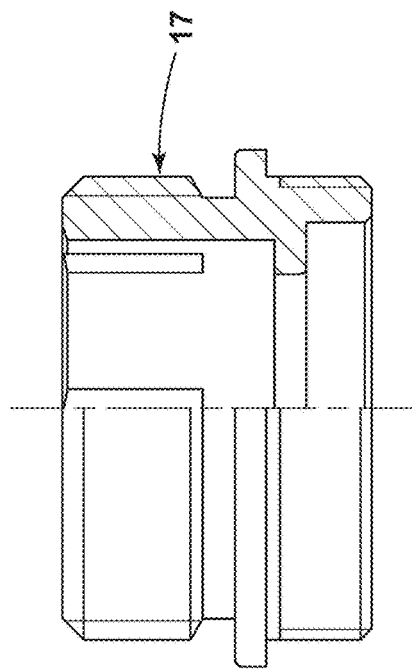
FIG. 11 is a front partial cross-sectional view of the bonnet on the second port, as shown in FIG. 5.
Figure 13:
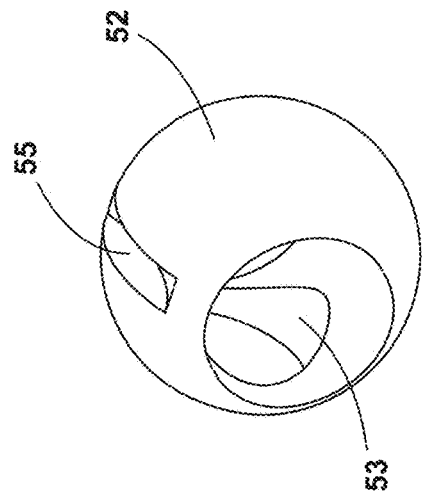
FIG. 13 is a front perspective view of one type of ball that can be used in the valves of the expansion tank valve assembly.
Figure 12:
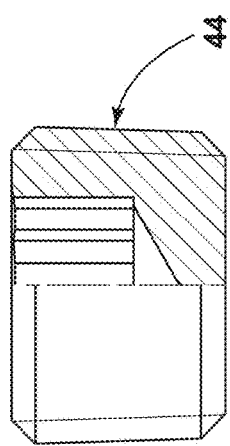
FIG. 12 is a front partial cross-sectional view of the plug.
Figure 14:
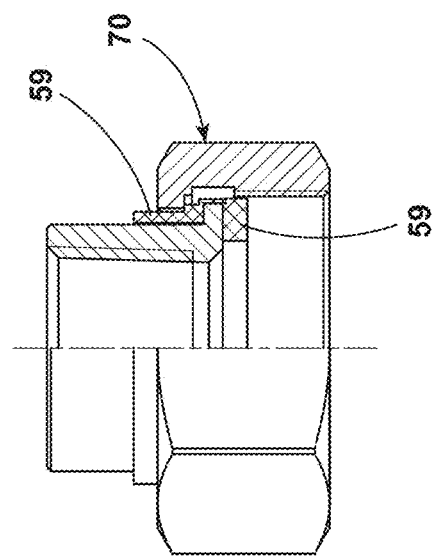
FIG. 14 is a partial cross-sectional view of a the dielectric union at the first port of the expansion tank valve assembly shown in FIG. 1.
Figure 15:
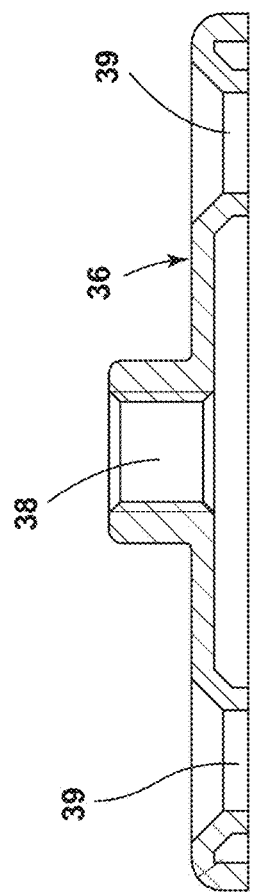
FIG. 15 is a cross-sectional view of the foot shown in FIG. 1.
Figure 17:
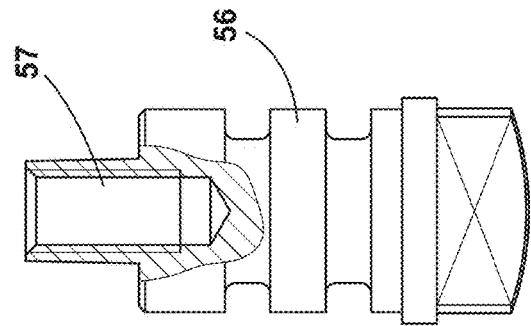
FIG. 17 is a partial cross-sectional view of the stem shown in FIG. 16 in an upright orientation.
Figure 16:
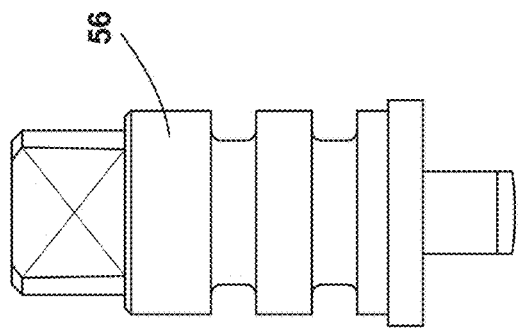
FIG. 16 is a front view of the stem of one of the valves shown in FIG. 1.
Figure 18:
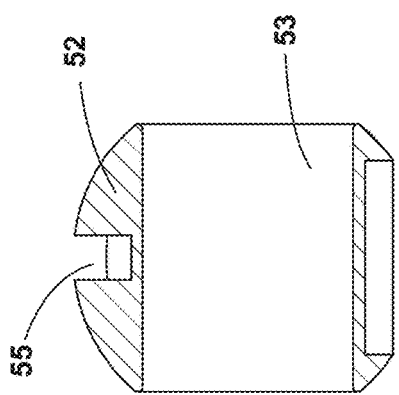
FIG. 18 is a cross-sectional view of another of the balls that can be used in the valves shown in FIG. 1.

In the illustrated embodiment, the body 4 of the expansion tank valve assembly 2 is a unitary body, as illustrated in FIGS. 6-8. The first port 14 and a second port 16 of the first end portion 6 are in generally vertical orientation when the expansion tank valve assembly 2 is installed to have the expansion tank 50 in a generally vertical orientation above the body 4. In this orientation, the third port 18 of the second end portion 8 will be in a generally vertical orientation and the fourth port 20 will be in a generally horizontal orientation. The fifth port 22 in the medial portion 10 will be in a generally vertical orientation. The medial portion 10 also includes a plug opening 42, which is shown in a generally horizontal position. The medial portion 10 also has a tab 30 with a tab opening 32 that is in a generally horizontal position.

The second port 16 can include a bonnet 17 which permits the coupling of the second port 16 to the cold water feed C. Different types of connection can be used to connect to a copper, cross-linked polyethylene pipe (PEX), or other cold water feed C, including, but not limited to, male and female pipe thread (MPT, FPT), push-to-connect, press fit, crimp, and any other coupling means.

The first port 14 includes a dielectric union 70 to secure the body 4 to a hot water tank 100, as illustrated in FIG. 21. The dielectric union 70 can include seals 59 to help prevent leaks in the coupling of the first port 14 and the connection to the hot water tank 100. The dielectric union 70 permits the joining of materials that can be made dissimilar metals to avoid electrolysis.

The first valve member 24 is coupled to the first valve opening 25 (FIG. 6) in the body 4. The first valve member 24 has a handle 74 that is secured to the stem 56 via a fastener 76. The stem 56 includes sealing rings 54, which help seal the stem 56 to the first valve opening 25. The sealing rings 54 can be O-rings made of an elastic material, such as rubber The stem 56 will connect to a ball 52, which has a fluid passageway 5 and a stem opening 55. Once assembled, the first valve member 24 can be opened or closed to control the flow of cold water to the hot water tank 100, providing a way to isolate the hot water tank 100 from the cold water feed C.

The fluid passageway 5 includes a vacuum breaker 40, which is coupled to the fifth port 22. In the illustrated embodiments, the fifth port 22 is a female national pipe thread (NPT) opening that can couple to a male NPT located on or connected to the vacuum breaker 40. A plug 44 is coupled to the plug opening 42. The plug 44 can be removed to attach a gauge 102 to provide pressure or other readings, as illustrated in FIG. 21.

The tab 30 extends from an outer surface of the medial portion 10 of the body 4. The tab 30 includes an opening 32. In the illustrated embodiment, the opening 32 is threaded and receives threaded rod 34. The threaded rod 34 is coupled to a foot 36. The threaded rod 34 can be made of any material, but in the illustrated embodiment, it is a metallic rod 34. The foot 36 can also be made from any material. In the illustrate embodiment, the foot 36 is an epoxy-coated metallic F&M plate. The foot 36 has a threaded opening 38 that receives the threaded rod 34. As illustrated in FIG. 21, the foot 36 can be a generally horizontal position on the top of the hot water tank 100. Washers 41 can be used to adjust and secure the height of the threaded rod 34 with respect to the foot 36 and the tab 30. Foot 36 can include openings 39 for other fasteners for attaching the foot 36 to the hot water tank 100 or other surface.

In the illustrated embodiment, the third port 18, located at the second end portion 8, has a female NPT port. In the illustrated embodiment, the expansion tank 50 is coupled to the third port 18. The second valve member 26 is coupled to the second valve member opening 27 in body 4 utilizing a fastener 76 which secures the handle 74 to the stem 56. Seals 58 seal the stem 56 with respect to the second valve member opening 27 in the body 4. The ball 52 is positioned within the fluid passageway 5. The sealing ring 54 seals against surfaces on the ball 52. In the illustrated embodiment, the second valve member 26 is an L-style ball valve. In one position, the second valve member 26 will open the fluid passageway 5 from the medial portion 10 of the body 4 to the third port 18 and the expansion tank 50, but blocks the fourth port 20. In a second position, the fluid passageway 5 in the medial portion 10 is closed with respect to the third port 18, however, the third port 18 and the fourth port 20 will be open to each other, i.e., in fluid communication. This second position of the second valve member 26 permits the opening of the cap 60 connected to the fourth port 20 via lanyard 62 to drain the expansion tank 50. The fourth port 20 can include a bonnet 21 with a garden hose thread coupling to permit coupling of the fourth port 20 to a garden hose to assist in the draining. The second position of the second valve member 26 can also be used for service and/or replacement of the expansion tank 50.

In the illustrated embodiment, the second valve member 26 is a three-way ball valve and, more specifically, an L ball valve. In contrast, in the illustrated embodiment, the first valve member 24 is a two-way ball valve. In alternative embodiments, the first valve member 24 can be positioned at the intersection of the vertical and horizontal portions of the tee 12 and can be a three-way ball valve. Other types of ball valves or other types of valves can be used with the body 4.

In the illustrated embodiment shown in FIG. 21, the cold water feed C is coupled to the second port 16. The vacuum breaker 40 is installed into the fifth port 22 and a gauge 102 is installed on the plug opening 42. The cap 60 is coupled to the fourth port 20 and the expansion tank 50 is coupled to the third port 18. The foot 36 is positioned on the top surface of the hot water tank 100 so that the body 4 is in a generally horizontal position with respect to the top of the hot water tank 100. The rod 34 and foot 36 in combination with the tab 30 on the body 4 help support the weight of the expansion tank 50 and the overall expansion tank valve assembly 2. It also permits the expansion tank valve assembly 2 to be in the correct position so as not to put rotational stress on the cold water feed C or the dielectric union 70 between the body 4 and the hot water tank 100.

The body 4 is a unitary piece that can be made of any material. For example, the body 4 can be made of metallic material, such as brass, and more specifically can be made from lead-free brass. The body 4 can also be made of a different metallic material and/or can include surface coatings and/or treatments. The unitary piece eliminates potential leak paths in comparison to a body 4 made of multiple components. For example, leak paths between the first end portion 6, the medial portion 10, and the second end portion 8 are eliminated in the body 4 as well as leak paths within the portions (6, 8, 10) themselves.

Figure 20:
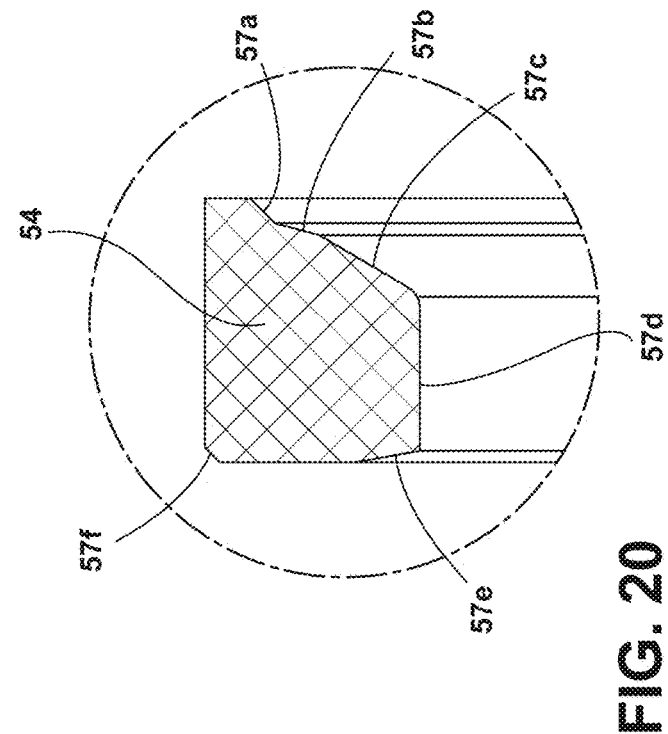
FIG. 20 is a partial sectional view taken along section XX of FIG. 19.
Figure 19:
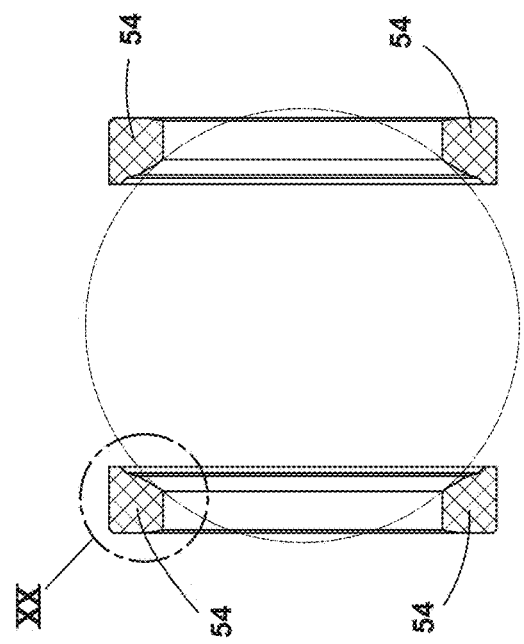
FIG. 19 is a view of the sealing rings that can be used with the balls of the valves shown in FIG. 1.

As illustrated in FIGS. 19-20, the sealing ring 54 provides a sealing surface against surfaces the ball 52. The sealing surfaces can include a variety of angles (57a-57f), as shown in FIG. 20. The sealing ring 54 provides a seal between the body 4 and the ball 52 to prevent leak paths so that when the first valve member 24 or second valve member 26 is closed, the fluid passageway 5 is fully closed and sealed.

Figure 22:
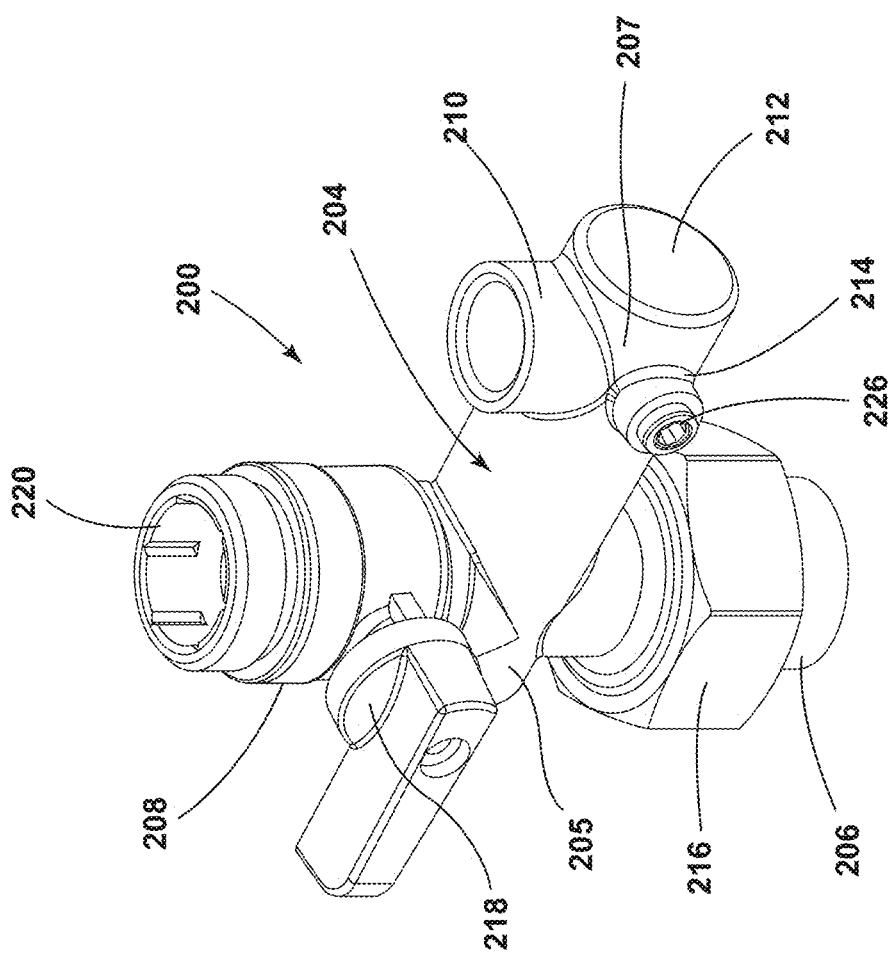
FIG. 22 is a front perspective view of a valve assembly without the expansion tank coupling.
Figure 23:
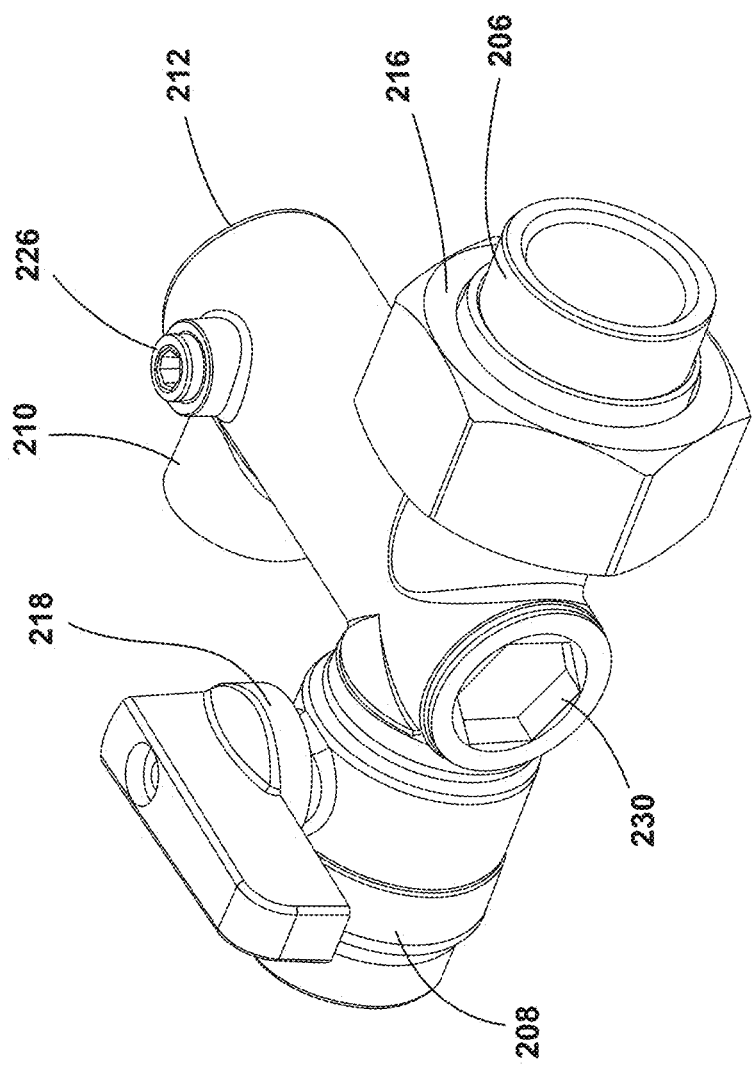
FIG. 23 is a side perspective view of the valve assembly of FIG. 22.
Figure 24:
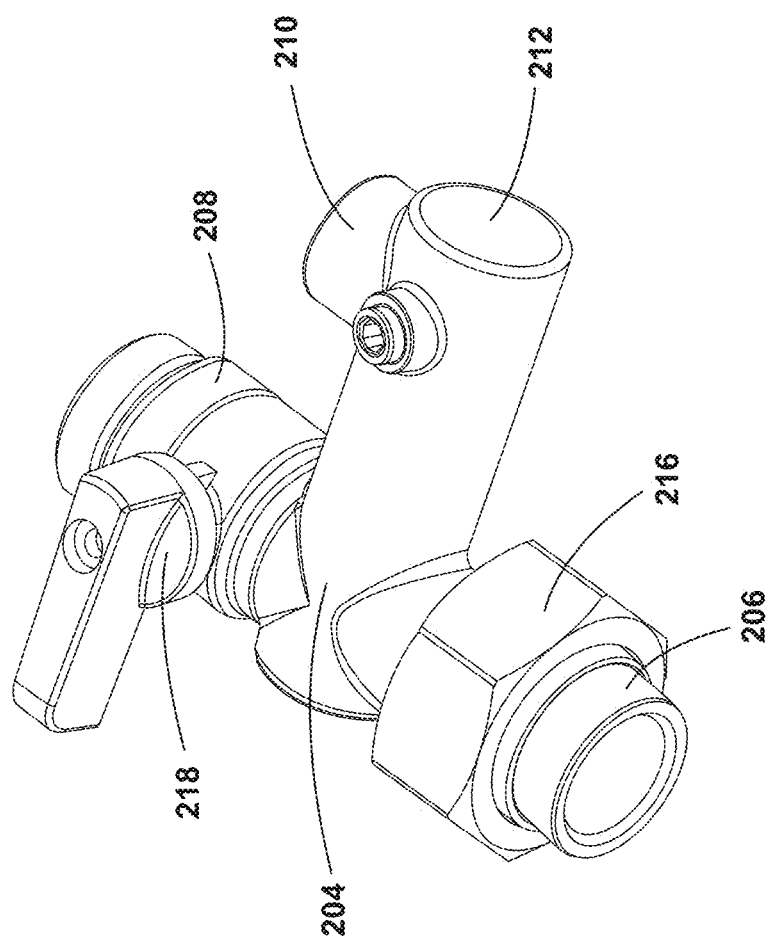
FIG. 24 is a bottom perspective view of the valve assembly of FIG. 22.

An embodiment of a valve assembly 200 is shown in FIGS. 22-24. The valve assembly 200 includes a body 204. The body 204 has a first end portion 205 and a medial portion 207. The first end portion 205 has a first port 206 with a dielectric union 216. The first end portion 205 also has a second port 208 with a bonnet 220. The body 204 also has a medial portion 207 with a fifth port 210, a formed end 212, and a plug opening 214. In the illustrated embodiment of FIGS. 22-24, the valve assembly 200 has a plug 226 coupled to the plug opening 214. The first port 206 is configured to couple to a hot water tank or other part of the plumbing system. The second port 208 is configured to couple to a water supply. The fifth port 210 can couple to a vacuum breaker 40 or other plumbing component. The plug opening 214 can include a gauge connected to the opening 214. The first end portion can include a cap 230, as illustrated in FIG. 23.

In the illustrated embodiment, the body 204 is a unitary body made from a metallic material, such as brass, or more specifically, a lead-free brass. The couplings between the body 204 and other components in the plumbing system can be any type of coupling, including, but not limited to, press-fit, push-to-connect, PEX, sweat, male and/or female NPT fittings, crimp, etc. The first valve member 218 opens and closes the fluid passageway between the second port 208 and the remainder of the body 204.

This valve assembly 200 is similar to the expansion tank valve assembly 2 shown in FIGS. 1-21, but does not have the second end portion 8. In the embodiment shown in FIGS. 22-24, the valve assembly 200 does not have a tab 30 extending from the medial portion 207. However, the valve assembly 200 can include a tab 30 that couples with a rod 34 and a foot 36.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. An expansion tank service valve assembly, comprising:
   a unitary body having a passageway with a first end portion, a second end portion, and a medial portion located between said first end portion and said second end portion, including:
      a tee located within said first end portion, said tee including a generally vertical section with a first port and a second port and a generally horizontal section extending into said medial portion;
      a generally vertical third port and a generally horizontal fourth port located within said second end portion;
      a fifth port located within said medial portion; and
      a tab extending from an exterior surface of said medial portion;
   a first valve member received in the passageway in said first end portion, said first valve member opening said passageway to said second port when said first valve member is in a first position, and said first valve member closing said passageway to said second port when said first valve member is in a second position; and
   a second valve member received in the passageway in said second end portion, said second valve member connecting the passageway to said third port while blocking the fourth port when said second valve member is in a first position, and said second valve member closing said passageway to said third port when said second valve member is in a second position.

2. The expansion tank service valve assembly of claim 1, further including a threaded plug coupled to an opening in said body.

3. The expansion tank service valve assembly of claim 1, wherein said first port includes a dielectric union.

4. The expansion tank service valve assembly of claim 1, including a tank coupled to said third port.

5. The expansion tank service valve assembly of claim 1, including a rod and base coupled to said tab.

6. The expansion tank service valve assembly of claim 1, wherein said first valve member is a two-way ball valve.

7. The expansion tank service valve assembly of claim 1, wherein said second valve member is an L-style ball valve.

8. The expansion tank service valve assembly of claim 1, including a vacuum breaker coupled to said fifth port.

9. The expansion tank service valve assembly of claim 1, including a cap coupled to said fourth port.

10. The expansion tank service valve assembly of claim 1, wherein said unitary body is made from brass.

11. The expansion tank service valve assembly of claim 1, wherein said second port includes a bonnet.

12. An expansion tank service assembly, comprising:
    a unitary body having a passageway with a first end portion, a second end portion, and a medial portion located between said first end portion of said second end portion, including:
       a generally vertical portion with a first port located at said first end portion;
       a generally vertical third port located at said second end portion;
       a fifth port located within said medial portion; and
       a tab with a threaded opening extending from an exterior surface of said medial portion;
    a second valve member positioned in the passageway in said second end portion, said second valve member opening said passageway between said medial portion and said third port when said second valve member is in a first position, and said second valve member closing said passageway between said medial portion and said third port when said second valve member is in a second position;
    a vacuum breaker coupled to said fifth port;
    a threaded stand coupled to said tab; and
    a tank coupled to said third port.

13. An expansion tank service assembly of claim 12, including a plurality of nuts coupled to said threaded stand.

14. An expansion tank service assembly of claim 12, wherein said unitary body is made from a metallic material.

15. An expansion tank service assembly of claim 12, wherein said first port includes a dielectric union.

16. An expansion tank service assembly of claim 12, wherein said second valve member is a three-way ball valve.

17. An expansion tank service assembly of claim 12, including a first valve member positioned in the passageway in said first end.

18. An expansion tank service assembly, comprising:
    a unitary body having a passageway with a first end portion, a second end portion, and a medial portion located between said first end portion and said second end portion, including:
       a generally vertical first port located in said first end portion;
       a generally vertical third port located in said second end portion;

a generally vertical fifth port located on said medial portion; and a tab with an opening extending from an exterior surface of said medial portion;

a second valve member positioned in the passageway in said second end portion, said second valve member opening said passageway between said medial portion and said third port when said second valve member is in a first position, and said second valve member closing said passageway between said medial portion and said third port when said second valve member is in a second position;

a vacuum breaker coupled to said fifth port;

a vertical member coupled to said tab;

a horizontal member coupled to the bottom of said vertical member; and a tank coupled to said third port.

19. The expansion tank service assembly of claim 18, including a generally horizontal fourth port located in said second end portion.

20. The expansion tank service assembly of claim 18, including a plug coupled to a sixth port located in said first end portion.

* * * * *